United States Patent Office 3,804,920
Patented Apr. 16, 1974

3,804,920
RESIN COMPOSITIONS
Arthur L. Cunningham, Park Forest, John E. Damon, Chicago Heights, and Zenon P. Bohatiuk and John Mathai, Chicago, Ill., and Howard D. Holton, Cleveland, Ohio, assignors to The Sherwin-Williams Company, Cleveland, Ohio
No Drawing. Filed Mar. 29, 1972, Ser. No. 239,339
Int. Cl. C08g 37/34
U.S. Cl. 260—850         19 Claims

ABSTRACT OF THE DISCLOSURE

The coating resin disclosed herein comprises the reaction product of:

(a) a linear polyester having high chain stiffness, a molecular weight of 1,500–8,000, an aromaticity, as defined hereinafter, of at least 25%, preferably at least 35%, and combined acid and hydroxyl number of 20–52 mg. KOH per gram;
(b) a linear polyester having high chain flexibility characterized by having an aromaticity of less than 20%, preferably 0–5%, a molecular weight of 1,500–8,000, and a combined acid and hydroxyl number of 20–52 mg. KOH per gram;
(c) an aminoplast derived from a diamino or triamino derivative of 1,3,5-triazine and capable of reacting with hydroxy and carboxylic acid groups in components (a) and (b) to produce the thermoset resins; and
(d) an acid catalyst.

The resins of this invention have excellent adhesion, extendability and flexibility, making them particularly suitable for coating metal, particularly where the coatings may be exposed to high stresses, such as in coatings on flat coil stock.

BACKGROUND OF THE INVENTION

Field of the invention

This invention relates to a thermosettable polyester resin composition. More specifically, it relates to a combination of two linear, saturated polyesters, one having high stiffness characteristics and the other having high flexibility. Still more specifically, it relates to a three component system in which the two types of polyesters are combined with an aminoplast capable of reacting with and thermosetting the polyester resins.

Related prior art

Saturated polyester or oil-less alkyl-based enamels have been receiving attention as coatings for metal substrates. However, while some of these compositions have attractive properties in hardness, weather resistance, exterior color fastness and like qualities, the resins need improvement in adhesion, extendability and flexibility in order to resist the high stresses to which the coatings may be exposed when the metal is formed in the useful product.

References disclosing such oilless alkyd-based enamels are the following: "Oil-Free Alkyds," D. L. Edwards et al., Paint and Varnish Production, September 1966, pages 44–48; "Polyester Resins," D. C. Finney, same journal and same volume, pages 27–31; "Hexakis(Methoxymethyl)Melamine," Journal of Paint Technology, vol. 58, No. 501, October 1966, pages 600–609.

Taylor U.S. Pat. No. 3,382,295 discloses the blending of polyesters having high molecular weights, one polyester having a glass transition temperature of 40° C. to 120° C., and the other polyester having a low glass transition temperature in the range of −50° C. to 40° C., with a difference of at least 15° in the two glass transition temperatures. The combination of these two polyesters is mixed with pigment and ground to a very fine size for particle spray application to preheated metal, thereby fusing the resin particle into a continuous coating. The resultant thermoplastic coating is a blend of the two polyester resins modified with fillers and other additives, but lacking in many of the essential properties required for resisting the stress to which a coating will be subjected when the metal is to be formed after the coating has been applied. Moreover, the molecular weights used are unsuitable for satisfactory preparation of solutions in common or practical solvents of sufficient solids content for use in paints or enamels. For example, the lowest intrinsic viscosity reported is that given in Example 5, namely 0.59. This calculates to a molecular weight of about 20,000 which upon testing in the common paint solvents gives a solids content of 25–30% instead of the 40–60% required. Furthermore, polyesters of such high molecular weight when cured with aminoplasts are found to have unsatisfactory solvent resistance.

STATEMENT OF THE INVENTION

In accordance with the present invention, polyester resin compositions particularly suitable for coating metal and capable of withstanding the stresses encountered in the shaping and forming of the metal comprise a three component combination of (1) 50–95, preferably 60–80 parts of a linear polyester, preferably saturated, of 1,500–8,000, preferably 2,000–5,000 molecular weight having a high stiffness due to the presence of at least 25%, preferably at least 35% aromaticity, and also having free hydroxy or carboxylic acid groups therein capable of reacting with an aminoplast, such that the combined hydroxy and acid number is in the range of 20–52 mg. KOH per gram of polyester; (2) 5–50, preferably 20–40 parts of a linear polyester, preferably saturated, having a molecular weight of 1,500–8,000, preferably 2,000–5,000, high flexibility imparted by having less than 20%, preferably 0–5% of aromaticity therein, and free hydroxy or carboxylic acid groups therein to give a combined hydroxy/acid number of 20–52 mg. KOH per gram of polyester, the combined weight of (1) and (2) totalling 100 parts; (3) 5–30, preferably 10–15 parts per 100 parts of (1) and (2) of an aminoplast capable of reacting with the free hydroxy and carboxylic acid groups in components (1) and (2) and derived from a 2,4-diamino or 2,4,6-triamino 1,3,5-triazine by replacing at least 4 hydrogen atoms of said amino groups by groups having the formula —NR″OR‴ wherein R″ is a divalent saturated aliphatic hydrocarbon group of 1–6 carbon atoms having both valencies on the same terminal carbon atom and R‴ is either an alkyl group of 1–6 carbon atoms or a group of the formula

wherein

R represents hydrogen, methyl or ethyl,
R′ represents a polyvalent aliphatic radical of 2–5 carbon atoms with its valency having a value of $n+1$,
$n$ represents an integer having a value of 1 to 3, and having a value of only 1 when R′ has only two carbon atoms,
$x$ represents an integer having a value of at least 1, and
$x'$ represents 0 or an integer having a value of 1 or more, and the total value of $x$ and $x'$ being such that the molecular weight of the R‴ group does not exceed 2,000;

and (4) 0.05–1%, preferably 0.1–0.5% based on total composition of an acid having an ionization constant ($K_a$) of $10^{-2}$ or greater or their salts or fugitive derivatives which will generate the acid in situ.

STIFF AND FLEXIBLE POLYESTER COMPONENTS

"Aromaticity" or "cyclic structure" is defined as the percent of a particular composition representing the content of aromatic or other ring structures, whether aromatic or aliphatic in nature. This "aromaticity" gives the composition a rigidity or stiffness due to the ring structure portion of the composition being incapable of rotating or flexing on its linear axis. In contrast, linear aliphatic chain structures are capable of rotating and flexing along the linear chain. Consequently, polyester structures having a high degree of aromatic or other types of ring structures have a high degree of stiffness or rigidity. In contrast, polyesters having a low degree of aromaticity or ring structure have a high degree of flexibility and extendability. In accordance with the present invention it has been found that the proper combination of these two types of polyesters, when applied and thermoset with an aminoplast, (I) 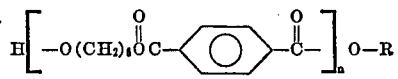

(II) 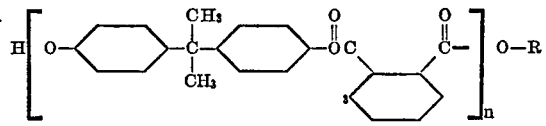

give excellent adhesion, extendability and flexibility particularly suited for coating metals, especially when the metals are to be shaped or otherwise deformed and thereby subject the coating to various types of stress.

The degree of aromaticity is controlled by the type of diol or dibasic acid used in preparing the polyester polymeric chains. Thus, a high proportion of aromatic diol such as hydroquinone, resorcinol, dimethylol benzene, etc., or aromatic dibasic acid such as phthalic acid, or aliphatic ring structures such as tetrahydrophthalic acids, cyclohexane diacetic acid, cyclohexyl dicarboxylic acid, cycloaliphatic diols, etc., impart aromaticity or cyclic structure to the resultant polyester. In contrast, low aromaticity or cyclic structure is imparted by using high proportions of aliphatic diol such as ethylene glycol, diethylene glycol, triethylene glycol, 1,4-butane diol, hexane-2,5-diol, etc., and aliphatic dibasic acid such as adipic acid, succinic acid, azelaic cid, glutaric acid, pimelic acid, suberic acid, sebacic acid, decanedioic acid, etc., and impart a high flexibility and extendability to the resultant polyesters.

The percent or degree of aromaticity is calculated by determining the weight percentage represented by the ring structures, including aromatic and aliphatic ring structures, in a particular polyester composition. The compositions can be tailored to contain the desired amount of aromaticity by preselecting the amounts of various types of acids and diols that will go into the polyester structures.

While triols and tri-functional acids can be used in preparing the linear polyesters, substantial percentages of these are not desirable since they detract from the linear character of the polyesters and may detract from the flexibility, viscosity and other characteristics desired for applying the coatings. Therefore, if triols and tri-functional acids are used, they are used in very limited amounts and desirably not reacted completely so as to serve primarily as difunctional reagents. It has been found that inclusion of as little as 0.05 mole of tri-functional materials per total mole of polyol and polyacid results in a significant reduction in the flexibility and other desired properties of the ultimate compositions.

In preparing the polyesters, either the diol or the dibasic acid is used in excess so that there will be unreacted hydroxy or carboxylic acid groups remaining in the polyester to give the desired 20-52 combined hydroxy and acid number as defined above. The presence of these functional groups permits the subsequent reaction with the aminoplast to give the thermosetting characteristics as well as the excellent adhesion and toughness to the coatings. The desired combination of properties has been found to exist in the ultimate products when the starting molecular weights of the polyester are maintained in the range of 2,000–8,000 $M_n$ as determined according to end group analysis by the method described hereinafter and by maintaining the combined hydroxy-carboxy number in the range defined. Variations from these ranges are found to cause deficiencies in one property or other of the ultimate composition.

As a typical illustration of the precent aromaticity, the percent of phenylene groups in poly(hexamethylene terephthalate) (I) is calculated as 30.6%. In the polyester poly-(2,2-propylene bis-1,4-cyclohexylene hexahydrophthalate) (II) aromaticity is calculated as 77.1%. In the latter case the aromaticity is calculated on the basis of the percent of cycloaliphatic ring structures represented in the total composition.

Poly(hexamethylene terephthalate).

Poly(2,2-propylenebis-1,4-cyclohexylene hexahydrophthalate).

It has been found that an aromaticity in excess of 25%, preferably at least 35%, by weight, is desired to achieve sufficient chain stiffness in the polyester so that it can be employed as the rigid or stiffening component in the resin invention. Preferred aromaticity is in the range of 55–65%.

In the flexible polyester component, it is desirable to have less than 20%, preferably 0–5% aromaticity.

The polyesters are advantageously utilized as solutions in their application, and therefore, in addition to the other desired properties in the ultimate composition, the molecular weight is desirably maintained in the range of 1,500–8,000, preferably 2,000–5,000, to insure solubility, particularly where symmetry in the linear polymer chain may contribute crystallinity to the polyester and may thereby render the polyester insoluble or impart less than the desired amount of solubility.

Because of the inherent difficulty of working with the stiff polyester component of this invention, it is generally utilized as a solution in an organic solvent. It is also advantageous to have the flexible polyester component in solution form for the compounding operation. The solubility of the polyester components in practical commercially available solvents such as those commonly used for industrial organic coatings is therefore important.

With polyesters of the molecular weight range of this invention, solutions may be prepared in practical solvents having 40–60% solids and a viscosity suitable for applying as coatings and films. With higher molecular weight polyesters, solutions in practical solvents having suitable flow characteristics or viscosities contain no more than about 25% or 30% at most. Such solutions containing 40–50% solids are semi-solid and too viscous for easy application as coatings.

When the polymer chain is made up of symmetrical diol and dicarboxylic acid repeating units, the linear polyester may be highly crystalline in nature. Therefore, in order to obtain noncrystalline, more easily dissolved polyester components, it is desirable to use unsymmetrical diols and dibasic acids. Mixtures of two or more diols or two or more dibasic acids may also be used. The resultant polymer should be rendered noncrystallizable to the extent that the polyester is soluble for a reasonable length of time.

Generally it is satisfactory to use lower molecular weight, unsymmetrical diols such as methyl ethanediol, 1-methyl propanediol, 2-methyl ethyl propanediol, 2,2,4-trimethyl pentanediol and similar unsymmetrically substituted diols. Diols which are otherwise symmetrical but contain oxygen or sulfur in the structure produce non-crystallizable polyesters.

Sometimes in order to avoid symmetrical structures and therefore to render the polymers non-crystallizable, it is advantageous to use mixtures of diols or mixtures of dibasic acids.

Typical unsymmetrical dibasic acids are isophthalic acid, orthophthalic acid, naphthalene dicarboxylic acids, biphenyl dicarboxylic acids, phenyl indene dicarboxylic acid, cyclohexyldicarboxylic acids, tetrahydrophthalic acid, hexahydrophthalic acid, etc. In approximate order of decreasnig crystallizability the "aromatic" 'dibasic acids can have the p-phenylene, p-cyclohexylene and o-phenylene structures.

The flexible polyester component, that is one having an "aromaticity" of less than 20%, preferably 0–5%, is also advantageously non-crystallizable in solutions stored at room temperature.

Compositions having crystalline melts suitably below room temperature or containing sufficient unsymmetrical radicals to render them soluble are appropriate.

The stiff polyester component therefore can be comprised entirely of "aromatic" or "cyclic" dibasic acids or diols or both, or comprised of a major part of one or both with a minor portion of alicyclic dibasic acid or diol or both. Similarly the flexible polyester components can be comprised entirely of alicyclic dibasic acid or diol or both, or comprised of a major portion of one or the other or both. The only requirement is that the stiff component has at least 25%, preferably at least 40% of the aromatic or cyclic repeating units, and the flexible polyester has less than 20%, preferably less than 5% of the aromatic or cyclic repeating units. Actually the same combination of cyclic and non-cyclic repeating units can be used in both the stiff and the flexible polyesters and the stiffness or flexibility controlled by the relative proportions of cyclic and non-cyclic structures.

In preparing the respective polyesters it is generally preferred to use an excess of the polyol so as to have unreacted hydroxy groups in the products. Very often the stoichiometric proportions are ⅔ hydroxy to ⅓ carboxy. However, it is also possible to have ⅔ carboxy to ⅓ hydroxy or any intermediate proportion provided there are sufficient unreacted hydroxy or carboxy groups or both to supply reactive sites for crosslinking with the aminoplast.

AMINOPLAST COMPONENT

Aminoplasts suitable for use in the practice of this invention are derived from diamino and triamino 1,3,5-triazines having the formlua

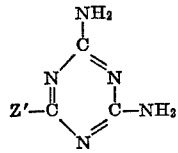

wherein Z' may represent a third —$NH_2$ group or phenyl, chloro, hydrocarbon group of 1–12 carbon atoms, etc., and the derivatives have at least 4 hydrogens of the respective —$NH_2$ groups replaced by groups having the formula —R"OR'" wherein R" and R'" represent the groups defined below.

Particularly appropriate aminoplasts for the purposes of this invention are those derived by the reaction of hexakis(methoxymethyl)melamine and related compounds with a polyether polyol. The polyether polyol is one derived by replacing one or more hydroxy groups of an aliphatic polyol, such as ethylene glycol, glycerine, pentaerythritol, etc., with an alkyleneoxy radical of the formula

wherein

R is hydrogen, methyl or ethyl; and $x$ is an integer having a value of at least 1 and for practical reasons does not exceed a value which will give the resultant polyol a molecular weight above 2,000.

The resins produced by this transetherification are useful as crosslinking agents for curing various types of other resins having free hydroxy groups therein such as saturated and unsaturated alkyd resins, acrylic resins or polyester resins to give improved properties in the cured product. Moreover, the crosslinking resins themselves have desirable properties such as increased reactivity and improved compatibility as compared to other resins used for such purposes.

These crosslinking resins are represented by the formula

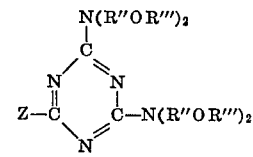

wherein

Z is preferably a —N(R"OR''')$_2$ group but can also be another group such as Cl, Br, —NR''''(R"OR'''), —N(R'''')$_2$, —R'''', —NH—$C_3N_3$[N(R"OR''')$_2$]$_2$ or —NHCH$_2$NH—$C_3N_3$[N(R"OR''')$_2$]$_2$;

R" is a divalent saturated aliphatic hydrocarbon radical of 1–6 carbon atoms having both valencies on the same terminal carbon atom;

R''' is an alkyl radical of 1–6 carbon atoms or the residue of a polyol having the formula

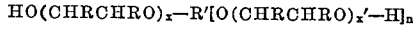

wherein

R represents hydrogen, methyl or ethyl;

R' represents a polyvalent aliphatic radical of 2–5 carbon atoms with its valency having a value of $n+1$;

$n$ represents an integer having a value of 1 to 3, and having a value of only 1 when R' has only two carbon atoms;

$x$ represents an integer having a value of at least 1;

$x'$ represents 0 or an integer having a value of 1 or more, and the total value of $x$ and $x'$ being such that the molecular weight of the R''' group does not exceed 2,000; and R'''' represents hydrogen or a hydrocarbon group (aliphatic, cycloaliphatic, aromatic or mixtures of such groups) of 1–12 carbon atoms, the aliphatic portions of such groups preferably being saturated.

In most cases, however, the average degree of methylolation of melamine is at least 5.75, and the average degree of methylation is generally at least 4.80. The reference to fractional methylolation and methylation means that in some cases six groups are attached, in other cases five groups are attached, or four groups, and the degree of methylolation or methylation reported as 5.75 or 4.80 merely means the average as calculated from the amount of hexa, penta and tetra, etc., present in the composition. In most cases for resin formation it is desirable to have at least four alkylated alkylol amine groups per molecule, and in the case of melamine it is preferred to have an average degree of methylolation of at least 5.75, and an average degree of methylation of at least 4.80.

While the methylolated and the methylated derivatives are referred to specifically in the preceding discussion, these same comments apply to the other alkylolated and alkylated derivatives used in this invention, In addition to the preferred —N(R″OR‴)₂ groups, Z may also be Cl, Br, —NR″″(R″OR‴), —N(R″″)₂, —R″″, —NH—C₃N₃[N(R″OR‴)₂]₂ and

—NHCH₂NH—C₃N₃[N(R″OR‴)₂]₂, wherein R″″ represents hydrogen or a hydrocarbon (aliphatic, cycloaliphatic, aromatic or mixtures of such groups) of 1–12 carbon atoms.

Thus, in addition to melamine, a number of other starting materials can be used for the alkylolation. These are triazine derivatives which have two instead of three amino groups attached to the carbon atoms of 1,3,5-triazine, commonly referred to as symmetrical triazine. These include the following: benzoguanamine(2-phenyl-4,6-diamino-1,3,5-triazine) and other 4,6-diamino-1,3,5-triazine compounds in which the 2 position is occupied by chlorine, bromine, aryl (meaning tolyl, xylyl, naphthyl and diphenyl as well as phenyl), alkyl (1–12 carbon atoms), alkyl amino, dialkylamino, aryl amino (aryl having 6–12 carbon atoms), diarylamino and the like.

Moreover, in addition to the methylol and methylated methylol aminotriazine derivatives preferred for this invention, various other alkylol and alkylated derivatives can be used such as the following: ethylol, propylol, butylol, methoxyethyl, methoxypropyl, methoxybutyl, ethoxymethyl, propoxymethyl, butoxymethyl, ethoxyethyl, propoxyethyl, butoxyethyl, ethoxypropyl, propoxypropyl, ethoxybutyl, butoxybutyl, and the like. These are prepared according to the same procedures used in preparing the methylol and methylated derivatives using acetaldehyde, propionaldehyde and butyraldehyde in place of the formaldehyde in the alkylolation and using ethanol, propanol and butanol in place of the methanol in the alkylation. It is also possible to prepare compounds having combinations of these groups in the same compounds by using mixtures of these aldehydes and mixtures of these alcohols in preparing the alkylol and alkylated derivatives.

A typical molecule derived from the condensation of an alkoxyalkylaminotriazine with a polyol in accordance with the practice of this invention is illustrated by the following formula of a compound derived by the reaction of hexakis(methoxymethyl)melamine with a polyethyleneoxy tetraol derived from pentaerythritol:

the various alkyleneoxide derivatives of glycerine, 1,1,1-trimethylol propane, pentaerythritol and the like in which the alkyleneoxy repeating units are attached to one or more hydroxy groups of the starting triol or tetraol, such as tris(polyethyleneoxy)glyceride, bis(polyethyleneoxy) glyceride, mono(polyethyleneoxy)glyceride, tris(polypropyleneoxy)glyceride, tris(polybutyleneoxy)glyceride, the tris(polyethyleneoxy)ether of 1,1,1-trimethylol propane, the bis(polybutyleneoxy)ether of 1,1,1-trimethylol propane, the tetra(polyethyleneoxy)ether of pentaerythritol, the tris(polyethyleneoxy)ether of pentaerythritol, the mono(polyethyleneoxy)ether of pentaerythritol, the tetra (polypropyleneoxy)ether of pentaerythritol, the tris(polypropyleneoxy)ether of pentaerythritol, the bis(polypropyleneoxy)ether of pentaerythritol, the tetra(polybutyleneoxy)ether of pentaerythritol, the bis(polybutyleneoxy) ether of pentaerythritol, and the like. Advantageously, these have molecular weights of at least 150, preferably at least 300.

The methods and conditions for attaching alkylol radicals, such as methylol, to the amine groups are well known in the art. Aqueous solutions of formaldehyde in various molecular proportions may be reacted with the amine compounds. At low temperatures, by prolonged reaction, the methylol compounds may be prepared and separated from the solution in crystalline form. At higher temperatures the methylol compounds are formed in a shorter time, for example upon boiling for several minutes. The solution is then cooled to avoid further condensation which will produce resinous products, and the methylol derivatives are precipitated by the cooling.

The reaction between formaldehyde and the amine groups may be effected in an organic medium instead of in water. Suitable organic solvents are methanol, ethanol, butanol, acetone, glycerine, benzyl alcohol and the like. The reaction may also be conducted in mixtures of water and organic solvents, for example 50% aqueous solutions.

Methods and conditions for alkylating the alkylol groups to alkoxyalkyl groups are likewise well known in the art. If the alkylation is conducted in the presence of an alcohol, acidification and continued heating will effect the alkylation. Otherwise the appropriate alcohol can

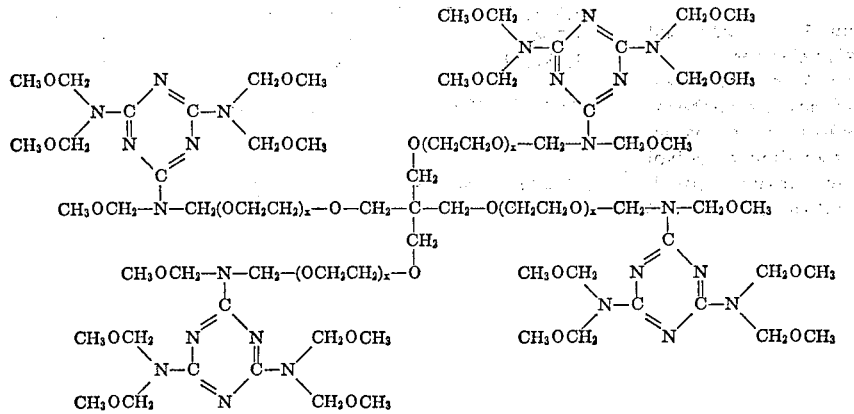

Depending on the conditions of preparation there may be some intercondensation between the monomeric molecules, by elimination of methanol, and there may be some corresponding dimers, trimers, etc. present. Moreover, depending on the ratio of reagents used and the completeness of the reaction in replacing the hydroxy groups of the polyol, there may be minor amounts of derivatives resulting from replacement of only three or two of the hydroxy groups of the tetraol.

Typical of the polyols that can be used as starting materials for preparing the intermediates useful in the practice of this invention are: polyethyleneoxide, polypropyleneoxide, polybutyleneoxide, mixed derivatives, such as polyethyleneoxide derivatives of propylene glycol, etc., be added after alkylolation and acidification and heating effected for this purpose.

The alkyleneoxy derivatives of polyols are prepared by well known methods for causing the addition of alkyleneoxy compounds such as ethyleneoxide to hydroxy groups. However many of these materials are available commercially as polyalkyleneoxy diols, triols and tetraols.

The order of addition of the reagents may be varied. In any case it is generally desirable to have efficient agitation to provide uniformity of distribution of the reagents as quickly as possible. For example, the melamine derivative may be added to the heated polyol containing the acid catalyst. Another suitable method is to mix the reagents at lower temperatures and then heat the mixture to the desired temperature for the appropriate period.

Condensation is best effected by controlling the pH so that it is less than 7 and preferably above 1. As the pH is lowered, the rate of reaction or condensation proceeds more quickly. However, it is desirable not to have the pH less than 1 since the ether groups are degraded under such conditions. The pH control is advantageously effected by the addition of various organic acids such as oxalic, acetic, etc. Sulfonic and mineral acids will also work, but if used in sufficient concentration to bring the pH below 1, this will cause degradation of the ether groups. Ion exchange resins which will give the desired pH range are also suitable.

When excess hexakis(methoxymethyl)melamine or related compound is used, this excess serves as a solvent and is also available to participate in the condensation when the products are used as crosslinking resins. It may also condense with itself. The other corresponding alkyloxyalkyl derivatives of this type react similarly.

These reagents generally can be uniformly mixed and the reaction controlled without solvents, but, if desired, solvents may be used. Suitable solvents are those which are unreactive with the agents and with the reaction products. These include hydrocarbons, namely toluene, xylene, benzene, aromatic naphtha, etc.; esters such as ethylacetate, butylacetate, etc.; ethers such as dioxane, and the like. Alcohols can be used as a solvent, but since some of it will react and replace methoxy groups, other solvents may be preferred. If a solvent is used, the concentration is not critical and the reaction will proceed satisfactorily either in dilute solution or concentrated solution.

The temperature for the condensation is advantageously in the range of 200–260° F., preferably in the range of 240–260° F. Lower pH's allow the use of lower temperatures for a particular reaction rate. Very low pH's will cause the reaction to go rapidly at lower temperatures. However products from the use of such low pH's will have very short shelf life. Therefore, it is generally desirable to maintain a pH in the upper portion of the indicated range, thereby permitting an extended shelf life, and using a high temperature range to effect the desired condensation. However, at temperatures above 260° F., the reaction proceeds so quickly it is necessary to quench the product to prevent reaction continuing into gelation.

In effecting the cure or condensation of such reaction product, either by itself or in admixture with other materials, the temperature is maintained at 200° F. or above. The cure is also catalyzed by maintaining the pH in the same range as indicated above, namely a pH of less than 7 and preferably more than 1.

These aminoplasts can be used as crosslinking agents with various types of resins having free hydroxyl, carboxyl, amide, amine and other labile hydrogen-containing groups. The crosslinking of these resins is effected by replacement of the alkoxy group by reaction with the hydroxy or other groups containing labile hydrogen and thereby the alkoxy and other groups are liberated as alcohol or other molecules which may be eliminated from the reaction mass, or may be retained in the mass.

Thus, these aminoplasts can be used as coupling agents for linear saturated and unsaturated polyester resins having free hydroxy groups, with saturated and unsaturated alkyds in which there are free hydroxy groups, acrylic resins in which comonomers are used in preparing the acrylic resin which have pendent hydroxy groups, etc. Also other resins having groups containing labile hydrogen, such as carboxylic acid groups, amines and amides can be used. The resulting crosslinked compositions can be used for various purposes such as protective coatings, film production, electrodeposition, etc.

With such crosslinking resins it is possible to obtain desired cures in much shorter time and to give products having improved properties as compared with other materials used for similar purpose. Moreover, the crosslinking resins have greater reactivity and improved compatibility with other materials as compared to materials used in the prior art. Moreover, the products have improved durability, high initial gloss and better gloss retention.

It is believed that the presence of ether groups in such crosslinking resins imparts greater flexibility to products, such as films, coatings, etc., in which such resins are incorporated. Consequently such products have less tendency to crack or craze and are less brittle than compositions having other crosslinking resins therein.

Generally resins which have good flexibility have the disadvantage of poor durability, particularly for exterior purposes. The resin combinations having the triazine derivatives as described herein have the unique advantage of very good flexibility and also good durability for exterior as well as interior purposes.

ACID CURING COMPONENT

As indicated above, the acid curing agent is one having an ionization constant of at least $10^{-2}$. This component may be the acid itself or a derivative which will generate the acid in situ, such as the commercially available Aerosol OT which generates sulfonic acid in situ, and $NH_4NO_3$ which can be decomposed to generate $HNO_3$. These agents comprise the acids that are generally used for curing aminoplasts such as p-toluene sulfonic acid, benzene sulfonic acid, methyl sulfonic acid, cyclohexyl sulfonic acid, nitric acid, phosphoric acid, mono- or dialkylphosphoric acids, e.g. butyl- or dibutylphosphoric acid, fluoroacetic acid and many others as indicated in the art as suitable for curing aminoplasts.

In effecting the cure of the compositions of this invention, the rate of cure is dependent on the temperature used and to some extent also on the amount of catalyst used, the rate increasing with increase in temperature and with the amount of catalyst. For example, these compositions will thermoset in as little as 10 seconds at 940° F. (ambient oven temperature) and in 50 seconds at 500° F. Generally an oven temperature of at least 400° F. is desirable. A cure time of at least two minutes is required at this temperature with the cure time decreasing with increase in temperature. Where the composition is applied to a preheated metal piece, that is at 380–470° F., preferably about 430° F., the cure is almost instantaneous.

METHOD OF DETERMINING ACID NUMBER, PERCENT HYDROXYL AND MOLECULAR WEIGHT

Acid number

The acid number is the milligrams of KOH required to neutralize 1 gram of sample. This is determined by titration with methanol solution of KOH to a phenolphthalein endpoint.

Percent hydroxyl

One mole of hydroxyl group reacts with one mole of acetic anhydride in the presence of pyridine to yield one mole of ester group and one mole of acetic acid. Upon completion of this reaction, water is added to hydrolyze the excess acetic anhydride to two moles of acetic acid. The acetic acid is then titrated with standard base, and the difference between this titration and a titration on a blank control gives the equivalents of acetic acid reacted with the hydroxyl group.

Reagents (a) Acetic anhydride-pyridine.—Using a one ml. graduated pipet, add 0.3 ml. $H_2O$ to 90 ml. reagent grade pyridine. After mixing add 29 ml. reagent grade acetic anhydride. Reagent should be prepared fresh each day. The presence of a small amount of water is necessary to prevent reaction between the pyridine and the acetic anhydride in the blank and a consequent reduction in blank's value. Too much water will result in incomplete reaction of the sample.

(b) Approximately 1.0 N KOH in methyl alcohol which has been accurately standardized against potassium acid phthalate.

(c) Phenolphthalein indicator (1%).—Dissolve 1 gram of phenolphthalein in 50 ml. of pyridine and dilute with 50 ml. of water.

Procedure (a) Weight to the nearest 0.0001 gram duplicate samples of about 60 grams of sample (NVM) into 250-ml. Erlenmeyer flasks with standard taper glass joints. Also have ready two additional flasks for duplicate blank determinations. The presence of a considerable amount of water (more than 0.002 mole) in the sample should be avoided. Water destroys the reagent by hydrolyzing it to acetic acid and prevents the complete acetylation of the hydroxyl.

(b) Pipet 10.0 ml. of the acetic anhydride-pyridine reagent into each flask, being careful to obtain the best possible reproducibility. Attach air condensers, place in an oil bath heated to about 135° C. and reflux gently for 30 minutes. Be sure the *reflux* time and not the *heating* time is 30 minutes.

(c) Remove from oil bath, add 10 ml. water through the condenser, rinsing the condensers as well as possible, swirl to bring water in contact with all of the reagent, and continue heating for *two* minutes. Oil bath temperature of about 120° C. is advisable at this point. Do not allow condensers to heat up more than a few inches above flasks.

(d) Cool in an ice bath.

(e) Rinse condenser and flask with about 10 ml. pyridine, add about six drops of indicator and titrate with 1 N methanolic KOH to a faint end point. The addition of water causes some resins to precipitate, making titration difficult. The addition of 25 ml. of a neutralized solvent such as butanol or a 1:1 mixture of xylene and alcohol may aid in the titration. For (04 82 21), styrene-allyl alcohol copolymer and certain resins, it is necessary to modify the procedure as follows:

In (c) in addition to 10 ml. of water, add 15 ml. of xylene; and

In (e) rinse the condenser with 10 ml. of butanol instead of pyridine.

(f) If free acid is present, determine the acid value by titration of a sample with KOH in methanol solution to a phenolphthalein end point. The acid value corresponds to the number of milligrams of KOH required to neutralize 1 gram of sample.

Calculations (a) In the absence of free acid $$\text{Percent hydroxyl} = \frac{(B-S)(N)(1.7)}{\text{weight sample}}$$

2. 3,4-dimthoxyphenylmethyl sulphoxide.

where

B=ml. of KOH used in titration of blank
S=ml. of KOH used in titration of sample
N=normality of KOH (b) In the presence of free acid $$L = \frac{(\text{acid No.})(\text{weight sample})}{N \times 56.1}$$

where

L=ml. of KOH used to titrate free acid
N=normality of KOH then $$\text{Percent hydroxyl} = \frac{(B+L-S)(N)(1.7)}{\text{weight sample}}$$

Molecular weight ($M_n$) determination

This is calculated using the equation:

$$M_n = \frac{3400}{\text{percent hydroxyl} + 33 \times \text{acid No.}}$$

SPECIFIC POLYESTER COMPONENTS

The dibasic acids and diols used in preparing ehe rigid and the flexible polyester components for the compositions of this invention advantageously each have no more than 20, preferably no more than 10 carbon atoms therein and comprise aliphatic, aromatic and cycloaliphatic compounds in accordance with the definitions of aromatic or cyclic portions described above. The aliphatic and cycloaliphatic portions are preferably saturated but can contain ethylenic unsaturation such as contained in maleic, fumaric, itaconic, tetrahydrophthalic acids and 2-butene-1,4-diol, etc. Acetylenic unsaturation may also be present, but such compounds are not practical because of their expense. The unsaturated components when present are used in minor proportions to avoid side reactions, premature crosslinking, discoloration, etc. Groups other than hydroxy and carboxylic acid groups may also be present such as in chlorosuccinic acid, chloromaleic acid, glycerylmonoacetate, chlorohydrin, etc.

Typical flexible polyesters

Poly(methyldimethylene adipate)
Poly(methyldimethylene gluterate)
Poly(2,2-dimethyl-3 isopropyl trimethylene adipate)
Poly(1-methyltrimethylene adipate)
Poly(ethylene succinate)
Poly(tetramethylene maleate-adipate)
Poly(trimethylene fumarate-gluterate)
Poly(1-methyltrimethylene chlorosuccinate)
Poly(1-acetoxymethyl-ethylene adipate)
Poly(tetramethylene itaconate-azelate)
Poly(tetramethylene gluterate)
Poly(trimethylene 2,2,4-trimethyladipate)
Poly(1-methyltrimethylene succinate)
Poly(tetramethylene dodecenylsuccinate)
Poly(hexamethylene adipate)
Poly(dodecamethylene adipate)

Typical rigid polyesters

Poly(methyldimethylene isophthalate)
Poly(methyldimethylene o-phtalate)
Poly(2,2-dimethyl-3 isopropyltrimethylene isophthalate)
Poly(1-methyltrimethylene isophthalate)
Poly(1-methyltrimethylene o-phthalate)
Poly(dimethylmethylene-biscyclohexylene-1,1,3-trimethyl-5-carboxylate-3-(p-phenyl carboxylate) indane)
Poly(methyldimethylene 1,1,3-trimethyl-5-carboxylate-3-(p-phenyl carboxylate) indane)
Poly(methyldimethylene/dimethylmethylene-bis-cyclohexylene isophthalate)
Poly(methyldimethylene isophthalate/o-phthalate)
Poly(methyldimethylene isophthalate/1,1,3-trimethyl-5-carboxylate-3-(p-phenyl carboxylate) indate)
Poly(methyldimethylene terephthalate)
Poly(1-methyltrimethylene naphthalene dicarboxylate)
Poly(1-methyltrimethylene diphenyldicarboxylate)
Poly(methyldimethylene cyclohexanediacetate)
Poly(ethylenecyclohexanedicarboxylate)

Various methods of practicing the invention are illustrated by the following examples. These examples are intended merely to illustrate the invention and not in any sense to limit the manner in which the invention can be practiced. The parts and percentages recited therein and all through the specification, unless specifically provided otherwise, are by weight.

PREPARATION OF FLEXIBLE POLYESTERS

Example I

Into a stainless steel reactor equipped with an agitator, a temperature controller and a 350 mm. Allihn condenser packed with 6 mm. x 6 mm. Exax Raschig rings, a distillation head and a Friedrick's condenser draining into a receiver adipic acid and 1,2-propanediol are charged as indicated in the table below. The reactants are brought to a temperature of 300° F. whereupon water is produced and passed through the partial condenser. The temperature is allowed to increase to 450° F. over a period of 8 hours keeping the temperature at the distillation head at the top of the packed condenser below 220° F. The reactants are held in the reactor for approximately 12 hours to an acid value of approximately 3–4 mg. KOH/g. The resultant polyester is reduced to 70% concentration in a 150° F. flash aromatic solvent (KB of 94). The results from a number of runs are tabulated below:

|  | A | B | C |
|---|---|---|---|
| Composition (parts charged): |  |  |  |
| Adipic acid | 1,839 | 1,992 | 1,992 |
| 1,2-propanediol | 1,340 | 1,244 | 1,166 |
| Polyester bulk properties: |  |  |  |
| Acid number | 3 | 4 | 4 |
| Hydroxyl number | 149 | 93 | 37 |
| Calculated $M_n$ | 740 | 1,500 | 2,790 |
| Calculated aromaticity | 0 | 0 | 0 |
| Properties of 70% solution in aromatic naphtha: |  |  |  |
| Viscosity (G–H) | B | E | J |
| Specific gravity | 1.0444 | 1.055 | 1.055 |
| Gardner color | 1 | 1+ | 2 |

Example II

The procedure of Example I is repeated a number of times to prepare other flexible polyesters using the reagents and obtaining the results tabulated below:

|  | D | E | F |
|---|---|---|---|
| Composition (parts charged): |  |  |  |
| Dimethyl glutarate | 1,358 |  |  |
| 1,2-propanediol | 700 |  |  |
| Adipic acid |  | 1,394 | 1,349 |
| 2,2-dimethyl-1,3-propanediol |  | 1,040 |  |
| 1,3-butanediol |  |  | 798 |
| Polyester bulk properties: |  |  |  |
| Acid number | 2.3 | 7.2 | 3.0 |
| Hydroxyl number | 35 | 38.6 | 23.4 |
| Calculated $M_n$ | 2,750 | 2,449 | 4,245 |
| Calculated aromaticity | 0 | 0 | 0 |
| Properties of solution in 50/50 blend of isophorone-aromatic naphtha: |  |  |  |
| Resin concentration | 99.5 | 59 | 78 |
| Viscosity (G–H—poise) | 60 | I–J | 40 |
| Gardner color | 6–7 | 2–3 | 1–2 |

PREPARATION OF STIFF POLYESTERS

Example III

A number of rigid polyesters are prepared using the procedure of Example I with the reagents and the results shown in the table below:

|  | G | H | I | J |
|---|---|---|---|---|
| Composition (parts charged): |  |  |  |  |
| 1,2-propanediol | 1,413 | 911 | 4,710 | 911 |
| Isophthalic acid | 2,091 | 1,400 | 8,450 | 1,744 |
| Polyester bulk properties: |  |  |  |  |
| Acid number | 3 | 3 | 10 | 6 |
| Hydroxyl number | 92.7 | 57.4 | 21 | 19.1 |
| Calculated $M_n$ (end group) | 1,190 | 1,850 | 3,500 | 4,350 |
| Calculated aromaticity (percent) | 36.9 | 36.9 | 36.9 | 36.9 |
| Properties of solution in aromatic naphtha: |  |  |  |  |
| Resin concentration (percent) | 70 | 60 | 59 | 60 |
| Viscosity (G–H—poise) | 36 | V+ | U– | 22 |
| Specific gravity | 1.1176 | 1.0828 | 1.0720 | 1.0828 |
| Gardner color | 1 | 2 | 1+ | 3 |

Example IV

Additional rigid polyesters are prepared using the reagents and obtaining the results tabulated below in Tables IVa, IVb and IVv:

TABLE IVa

|  | K | L |
|---|---|---|
| Composition (parts charged): |  |  |
| 1,2-propanediol | 756 | 968 |
| 1,1,3-trimethyl-5-carboxy-3-(o-carboxyphenyl) | 1,360 |  |
| Isophthalic acid | 696 |  |
| Dimethyl terephthalate |  | 2,218 |
| Polyester bulk properties: |  |  |
| Acid number | 4.7 | 9.1 |
| Hydroxy number | 35.3 |  |
| Calculated $M_n$ | 2,804 |  |
| Calculated aromaticity | 39.9 | 36.9 |
| Properties of solution in 50/50 blend of isophorone-aromatic naphtha: |  |  |
| Resin concentration | 61.5 | 62.5 |
| Viscosity (G–H—poise) | 100 | 30 |
| Gardner color | 7 | 9 |

TABLE IVb

|  | M | N | O | P |
|---|---|---|---|---|
| Composition (parts charged): |  |  |  |  |
| Phthalic anhydride | 1,574 |  |  | 1,554 |
| 1,2-propanediol | 899 |  |  |  |
| Isophthalic acid |  | 1,743 | 1,743 |  |
| 2,2,4-trimethyl-1,3-pentanediol-1,3-butanediol |  | 1,036 |  | 1,036 |
| Polyester bulk properties: |  |  |  |  |
| Acid number | 9.7 | 4.2 | 5.7 | 13.1 |
| Hydroxyl number | 8.9 | 30.0 | 39.1 | 28.5 |
| Calculated $M_n$ | 6,029 | 3,278 | 2,222 | 3,060 |
| Glass temperature, °C |  | 31 | 24 | 12 |
| Calculated aromaticity | 36.9 | 27.5 | 34.5 | 34.5 |
| Properties of solution in 50/50 blend isophorone-aromatic naphtha: |  |  |  |  |
| Resin concentration (percent) | 57 | 62.2 | 58.2 | 58.3 |
| Viscosity (G–H—poise) | 22 | U–V | 20 | N–O |
| Specific gravity |  | 1.0264 |  |  |
| Gardner color | 5– | 3–4 | 2 | 5 |

TABLE IVc

|  | Q | R | S | T |
|---|---|---|---|---|
| Composition (parts charged): |  |  |  |  |
| 2,2-bis(4-hydroxyl cyclohexyl)propane | 1,677 |  | 885 |  |
| 1,1,3-trimethyl-5-carboxy-3-(p-carboxyphenyl)indane | 1,701 | 1,904 |  |  |
| 1,2-propanediol |  | 508 | 280 | 880 |
| Isophthalic acid |  |  | 1,045 | 871 |
| Phthalic anhydride |  |  |  | 777 |
| Polyester bulk properties: |  |  |  |  |
| Acid number | 7.9 | 6.5 | 7.9 | 6.2 |
| Hydroxyl number | 13.0 | 8.5 | 30.0 |  |
| Calculated $M_n$ | 5,097 | 7,472 | 2,788 |  |
| Glass temperature, °C | 129 | 117 | 79 | 57 |
| Calculated aromaticity | 63.8 | 42.2 | 53.7 | 36.9 |
| Properties of solution in 50/50 blend of isophorone-aromatic naphtha: |  |  |  |  |
| Resin concentration | 50 | 50 | 60 | 61.5 |
| Viscotity (G–H—poise) | 19 | 24 | 85 | 50 |
| Specific gravity |  |  |  |  |
| Gardner color | 4 | 5+ | 5 | 7– |

PREPARATION OF AMINOPLASTS

Example V

To a three-liter, three-necked round bottom flask, equipped with a stirrer, thermometer, nitrogen inlet tube, condenser, Barrett trap and heater, there is added 1560 grams (4 moles) of hexakis(methoxymethyl)melamine, 2.0 grams oxalic acid, and 450 grams (1 mole) of a tetra-functional polyetherol derived from pentaerythritol and propyleneoxide and having an average molecular weight of 450. The reaction mixture is heated to 225° F. (107° C.) and methanol is collected in the Barrett trap. Samples are removed periodically and reaction is continued until an 80% solution in naphtha (100° C. flash) gives a Gardner-Holdt viscosity of W–Z. The reaction mixture is then diluted with 245 grams of this same solvent. The properties of the resulting mixture are:

NVM,[1] percent _____ 73.5
Viscosity (Gardner-Holdt) _____ W–Z
Wt./gallon _____ 9.1
Color _____ WW

[1] Non-volatile material—determined as weight percent residue after evaporation at 220° F. for two hours.

The values for non-volatile material (NVM) in the following examples is often lower than the theoretical amount of solids present based on the amount of solvent present. This is due to (1) the percent of solvent is based on the initial weights of the reactants and neglects the loss due to methanol elimination, (2) the temperature used in the NVM determination is high enough not only to evaporate the solvent, but also to carry the condensation reaction to completion—resulting in the loss of additional methanol.

Example VI

The procedure of Example V is repeated using 1170 grams (3 moles) of hexakis(methoxymethyl)melamine, 2.0 grams of oxalic acid and 700 grams (1 mole) of a triol derived from glycerine and ethyleneoxide and having a molecular weight of 700 and an average hydroxy number of 240. The reaction mixture is heated to 225° F.

(107° C.) and methanol is continuously removed and collected in the Barrett trap. Samples are removed periodically and the reaction is continued until an 80 percent by weight solution in naphtha (100° C. flash) gives a viscosity of W–Z (Gardner-Holdt), and then 233 grams of the same solvent are added to the reaction mixture. The reaction mixture is then cooled to room temperature. The resultant polymer has the following properties:

NVM,[1] percent _____ 75
Viscosity (Gardner-Holdt) _____ W
Color _____ WW

[1] Non-volatile material—determined as weight percent residue after evaporation at 220° F. (105° C.) for two hours.

Example VII

The procedure of Example V is repeated using 1170 grams (3 moles) of hexakis(methoxymethyl)melamine, 2.0 grams oxalic acid, and 250 grams (1 mole) of a triol derived from glycerine and propyleneoxide and having a molecular weight of 250 and a hydroxy number of 660. The reaction mixture is heated to 225° F. (107° C.) and methanol is distilled from the reaction and collected in the Barrett trap until 100 ml. of methanol is collected. The reaction mixture is then cooled and the resulting reaction product has the following physical properties:

Viscosity, cps. _____ 348,800
Wt./gallon _____ 10.1
NVM _____ 96.1

Example VIII

The procedure of Example V is repeated using 780 grams (2 moles) of hexakis(methoxymethyl)melamine, 2.0 grams of oxalic acid, 1000 grams (1 mole) of poly(propyleneoxide), a diol having an average molecular weight of about 1000. The reaction mixture is heated to 258° F. (125° C.) and the methanol distillate is continuously removed. Samples are removed periodically and heating is continued until an 80% solution in naphtha (100° C. flash) gives a Gardner-Holdt viscosity W–Z. The reaction mixture is then diluted with 445 grams naphtha. The properties of this product are:

NVM, percent _____ 74
Viscosity _____ W–Z

Example IX

The procedure of Example V is repeated using 780 (2 moles) grams of hexakis(methoxymethyl)melamine, 2.0 grams oxalic acid, and 400 grams (1 mole) of poly(ethyleneoxide), a diol with an average molecular weight of about 400. The reaction mixture is heated to a reaction temperature of 248° F. (120° C.) until no more methanol is given off. The resulting reaction product has the following characteristics:

Wt./gallon _____ 9.30
Viscosity, cps. _____ 473,600
NVM _____ 99.3

Example X

The procedure of Example V is repeated twice using 390 grams (1 mole) of hexakis(methoxymethyl)melamine, 1 gram oxalic acid and in one case (A) 467 grams (⅔ mole) nad in the other case (B) 117 grams (1/6 mole) of a triol derived from glycerine and ethyleneoxide, having an average molecular weight of 700 and an average hydroxy number of 240. Reaction at 225° F. (107° C.) is continued until an 80% solution in naphtha has a Gardner-Holdt viscosity of about U–W. Then 214 grams of naphtha is added to the A reaction mixture and 127 grams of naphtha to the B product. The resultant products have the following properties:

|              | A     | B     |
|--------------|-------|-------|
| Color        | WW    | WW    |
| NVM, percent | 72.41 | 72.98 |
| Viscosity    | U     | V     |

Example XI

The procedure of Example V is repeated twice using 390 grams (1 mole) of hexakis(methoxymethyl)melamine, 1 gram oxalic acid and in one case (A) 200 grams (½ mole) and in the other case (B) 50 grams (⅛ mole) of a tetraol derived from pentaerythritol and propyleneoxide, having an average molecular weight of 400. Reaction at 225° F. (107° C.) is continued until an 80% solution in naphtha has a Gardner-Holdt viscosity of about U–W. Then 148 grams of naphtha is added to the A reaction mixture and 100 grams to the B reaction mixture. The resultant products have the following properties:

|              | A     | B     |
|--------------|-------|-------|
| Color        | WW    | WW    |
| NVM, percent | 70.46 | 72.92 |
| Viscosity    | U     | V     |

Example XII

The procedure of Example VIII is repeated using 475 grams (0.5 mole) of a polypropyleneoxide diol having a molecular weight of 950 and a reaction temperature of 225° F. (107° C.). The resulting product [1] has the following properties:

NVM, percent _____ 78
Viscosity _____ V
Color _____ WW

Example XIII

The procedure of Example VIII is repeated using 100 grams (⅓ mole) of a triol derived from glycerine and propyleneoxide having an average molecular weight of 300, the triol being added as a 75% solution in toluene. The resulting product has the following properties:

NVM,[1] percent _____ 68.3
Viscosity _____ U
Color _____ S1 Amber

[1] Using 80 grams naphtha instead of 445 grams.

Example XIV

The procedure of Example V is repeated a number of times to produce compositions of this invention using in place of the polyol of that example an equivalent amount respectively of:

(a) A triol of a propyleneoxide derivative of 1,1,1-trimethylolpropane having an average molecular weight of 1000;

(b) A tetraol of a butyleneoxide derivative of pentaerythritol having an average molecular weight of 850; and (c) A triol of a butyleneoxide derivative of 1,1,1-trimethylolpropane having an average molecular weight of 600.

Example XV

The procedure of Example VIII is repeated a number of times to produce compositions of this invention using in place of the hexakis(methoxymethyl)melamine an equivalent weight respectively of symmetrical triazine

[1] Using 215 grams of naphtha instead of 445 grams.

derivatives having the indicated groups in the respective 2,4,6 positions.

| 2- | 4- | 6- |
|---|---|---|
| Phenyl | Bis(methoxymethyl)amino | Bis(methoxymethyl)amino. |
| Methyl | do | Do. |
| Chloro | do | Do. |
| Dimethylamino | do | Do. |
| Phenylamino | do | Do. |
| Methyl(methoxymethyl)amino | do | Do. |
| Bis(ethoxymethyl)amino | Bis(ethoxymethyl)amino | Bis(ethoxymethyl)amino. |
| Bromo | do | Do. |
| Ethyl(ethoxymethyl)amino | do | Do. |
| Bis(ethoxyethyl)amino | Bis(ethoxyethyl)amino | Bis(ethoxyethyl)amino. |
| Hydrogen | do | Do. |
| Butyl(ethoxyethyl)amino | do | Do. |
| Tolyl | Bis(butoxybutyl)amino | Bis(butoxybutyl)amino. |
| Phenyl(propoxypropyl)amino | Bis(propoxypropyl)amino | Bis(propoxypropyl)amino. |
| —NH—C₃N₃[N(CH₂OCH₃)₂]₂ | Bis(methoxymethyl)amino | Bis(methoxymethyl)amino. |
| —NHCH₂NHC₃N₃[N(C₂H₄OC₂H₅)₂]₂ | Bis(ethoxymethyl)amino | Bis(ethoxyethyl)amino. |
| —NH—C₃N₃[N(CH₂OC₃H₇)₂]₂ | Bis(butoxymethyl)amino | Bis(butoxymethyl)amino. |
| Bis(methoxymethyl)amino) | Bis(ethoxymethyl)amino | Bis(ethoxymethyl)amino. |

Example XVI

Enamels are prepared from various resins of the above examples by dispersing 20 parts by volume of a rutile titanium dioxide pigment per 80 parts by volume vehicle solids into a vehicle consisting of 100 parts polyester solids, 15 parts of the melamine crosslinker of Example V prepared from hexakis(methoxymethyl)melamine and polypropylene oxide tetraol and 0.2 part paratoluene sulfonic acid catalyst. The dispersion is effected by using a high speed disperser. The final enamel is adjusted to approximately 64 parts solid and 36 parts solvent consisting of a 50–50 blend of 150 flash aromatic naphtha and isophorone.

Enamels 1–10 are prepared from the stiff polyester alone and Enamels 11–29 are the preferred blend of stiff and flexible resins in accordance with the present invention. Film evaluations are run on 1 mil films cast on 0.024 inch thick aluminum panels and cured 50 seconds in a forced air circulating oven at 500° F. (260° C.). The specific tests run are those used to screen the suitability of a coating to high performance coil coating application, which include:

(1) Solvent resistance by methyl isobutyl ketone rub to determine degree of cure—10 best, 0 worst;
(2) 20° and 60° gloss on Gardner Multiangle gloss meter;
(3) Forty and fifty in.-lb. reverse impact;
(4) Rebake of above impacted panels 50 sec. at 500° F. (260° C.);
(5) Tight bends over one and two thicknesses of the coated aluminum (1–T and 2–T bends); and
(6) Rebake of above 2–T bends 50 sec. at 500° F. (260° C.).

The summary of results demonstrates the superior performance of the preferred blends of flexible and stiff polyesters. Results are rated on a 0–10 scale where 10 is best (no failure) and 0 is worst (complete failure).

The results of tests on Enamels 1–10 are reported below in Table V, those for Enamels 11–20 are reported in Table VI and those for Enamels 21–29 are reported in Table VII.

TABLE V

| Number | 100 parts stiff polyester | 15 parts cross-linker | Cure, secs./ 500° F. | Cure rating | Gloss 60/20 | Impact rating, 40/50 | Baked impact, 40/50 | Bend rating, 1T/2T | Baked bend, 2T |
|---|---|---|---|---|---|---|---|---|---|
| 1 | I | Example V | 50 | 10 | 98/75 | 3/0 |  | 0/3 |  |
| 2 | M | do | 50 | 10 | 8/2 | 0/0 |  | 0/2 |  |
| 3 | P | do | 50 | 0 | 93/70 | 0/0 |  | 0/9 |  |
| 4 | Q | do | 50 | 4 | 88/70 | 0/0 |  | 0/0 |  |
| 5 | R | do | 50 | 10 | 97/88 | 0/0 |  | 0/4 |  |
| 6 | S | do | 50 | 8 | 95/85 | 0/0 |  | 0/0 |  |
| 7 | T | do | 50 | 9 | 90/63 | 0/0 |  | 0/0 |  |
| 8 | K | do | 50 | 10 | 100/94 | 5/3 |  | 0/0 |  |
| 9 | O | do | 50 | 9 | 98/97 | 10/10 |  | 0/10 |  |
| 10 | N | do | 50 | 0 | 93/83 | 0/0 |  | 0/0 |  |

TABLE VI

| Number | 80 parts stiff polyester | 20 parts flexible polyester | 15 parts cross-linker | Cure, secs./ 500° F. | Cure rating | Gloss, 60/20 | Impact rating, 40/50 | Baked impact, 40/50 | Bend rating, 1T/2T | Baked bend, 2T |
|---|---|---|---|---|---|---|---|---|---|---|
| 11 | K | C | Example V | 50 | 10 | 100/85 | 10/10 | 10/9 | 7/10 | 9 |
| 12 | K | D | do | 50 | 10 | 100/81 | 6/5 | 3/2 | 4/10 | 9 |
| 13 | K | E | do | 50 | 10 | 100/86 | 10/10 | 9/8 | 9/10 | 10 |
| 14 | O | C | do | 50 | 10 | 95/76 | 10/10 | 10/9 | 10/10 | 10 |
| 15 | O | D | do | 50 | 9 | 94/84 | 10/10 | 8/6 | 10/10 | 10 |
| 16 | O | E | do | 50 | 10 | 92/83 | 10/10 | 9/8 | 10/10 | 10 |
| 17 | I | C | do | 50 | 10 | 93/80 | 10/10 | 9/8 | 7/10 | 9 |
| 18 | I | D | do | 50 | 10 | 98/81 | 8/7 | 6/5 | 7/10 | 5 |
| 19 | I | E | do | 50 | 10 | 98/80 | 10/10 | 7/6 | 9/10 | 10 |
| 20 | M | C | do | 50 | 10 | 30/4 | 6/5 | 6/5 | 7/10 | 9 |

TABLE VII

| Number | 80 parts stiff polyester | 20 parts flexible polyester | 15 parts cross-linker | Cure, secs./ 500° F. | Cure rating | Gloss, 60/20 | Impact rating, 40/50 | Baked impact, 40/50 | Bend rating, 1T/2T | Baked bend, 2T |
|---|---|---|---|---|---|---|---|---|---|---|
| 21 | M | D | Example V | 50 | 9 | 45/9 | 5/5 | 4/5 | 3/9 | 8 |
| 22 | M | E | do | 50 | 10 | 8/3 | 5/5 | 2/2 | 4/8 | 8 |
| 23 | R | C | do | 50 | 9 | 96/87 | 9/8 | 8/7 | 8/10 | 9 |
| 24 | R | D | do | 50 | 8 | 96/88 | 7/5 | 6/4 | 6/8 | 0 |
| 25 | R | E | do | 50 | 8 | 96/89 | 10/9 | 9/7 | 6/10 | 8 |
| 26 | S | C | do | 50 | 7 | 90/80 | 4/2 |  | 0/4 |  |
| 27 | T | C | do | 50 | 9 | 90/78 | 10/8 | 9/7 | 10/10 | 10 |
| 28 | T | D | do | 50 | 9 | 94/78 | 8/6 | 7/5 | 10/10 | 9 |
| 29 | T | E | do | 50 | 9 | 92/68 | 9/7 | 8/6 | 7/10 | 9 |

Example XVII

Results similar to those reported in Example XVI are obtained when the procedure of that example is repeated a number of times using individually in place of the crosslinker of that example equivalent amounts respectively of the various aminoplasts prepared in Example XV.

Example XVIII

The procedure of Example XVI is repeated a number of times using hexakis(methoxymethyl)melamine (HKM) in place of the crosslinker of that example in combination with the various mixtures of polyesters and the various conditions and results shown in the table below:

|  | Stiff polyester |  | Flexible polyester |  | HKM, Parts | Cure, secs./ 500° F. | Cure rating | Baked bend, 2T | Baked bend, 1T |
|---|---|---|---|---|---|---|---|---|---|
| Number | Name | Parts | Name | Parts |  |  |  |  |  |
| 1 | Propylene isophthalate (mol. wt. 1850; acid No. 3; hydroxy No. 57). | 80 | Propylene adipate (mol. wt. 1500; acid No. 4; hydroxy No. 93). | 20 | 15 | 35 | 0 | 10 | 10 |
|  | do | 80 | do | 20 | 15 | 45 | 7 | 10 | 10 |
|  | do | 80 | do | 20 | 15 | 60 | 9 | 10 | 0 |
| 2 | do | 75 | do | 25 | 15 | 35 | 0 | 10 | 10 |
|  | do | 75 | do | 25 | 15 | 45 | 7 | 10 | 10 |
|  | do | 75 | do | 25 | 15 | 60 | 9 | 10 | 4 |
| 3 | do | 70 | do | 30 | 15 | 35 | 0 | 10 | 10 |
|  | do | 70 | do | 30 | 15 | 45 | 7 | 10 | 10 |
|  | do | 70 | do | 30 | 15 | 60 | 9 | 10 | 3 |
| 4 | Propylene isophthalate (mol. wt. 4350; acid No. 6; hydroxy No. 19). | 80 | Propylene adipate (mol. wt. 2790; acid No. 4; hydroxy No. 37). | 20 | 15 | 35 | 4 | 10 | 10 |
|  | do | 80 | do | 20 | 15 | 45 | 6 | 10 | 10 |
|  | do | 80 | do | 20 | 15 | 60 | 8 | 10 | 8 |
| 5 | do | 75 | do | 25 | 15 | 35 | 7 | 10 | 10 |
|  | do | 75 | do | 25 | 15 | 45 | 6 | 10 | 10 |
|  | do | 75 | do | 25 | 15 | 60 | 8 | 10 | 9 |
| 6 | do | 70 | do | 30 | 15 | 35 | 0 | 10 | 10 |
|  | do | 70 | do | 30 | 15 | 45 | 6 | 10 | 10 |
|  | do | 70 | do | 30 | 15 | 60 | 8 | 10 | 9 |

Example XIX

Very satisfactory results are also obtained when the procedure of Example XVIII is repeated a number of times using individually in place of the HKM equivalent amounts respectively of tetrakis(methoxymethyl)benzoguanimine, hexkis(methoxyethyl)melamine and hexakis(ethoxymethyl)melamine.

Example XX

Two commercial polyester resins are selected having molecular weights above the range used in this invention, one having high aromaticity and the other having none. These have the following properties and, when formulated and tested according to the procedure of Example XVIII, have the properties shown in the table:

|  | C-1 | C-2 |
|---|---|---|
| Intrinsic viscosity | 0.59 | 0.77 |
| Acid number | 2.0 | 1.57 |
| Aromaticity (percent) | 30.1 | 0.0 |
| Specific gravity | 1.252 | 1.215 |
| Proportion used in mixture (percent) | 75 | 25 |
| Percent solids (50/50 MEK-toluene mixture) | [1] 29 |  |
| Cure (at 500° F.) sec | 100 |  |
| Cure rating | 4 |  |
| Baked bend 2T | 10 |  |

[1] 50% solids solution gives semisolid too viscous to apply as film so diluted to about 30%.

As illustrated in the above examples, the resin compositions of this invention are particularly useful in preparing coating enamels. For this purpose a filler such as titanium dioxide or others generally used in enamels is present in a proportion of 5–30 parts per 100 parts of resin components with the enamel advantageously containing 40–60 percent solids in the common enamel solvents such as naphthas, such as aromatic naphthas, isophorone and the like. Particularly suitable is a 50/50 blend of 150 flash aromatic naphtha and isophorone.

Such enamels are particularly suitable for preparing thermosetting films of improved flexibility which is novel since thermosetting films do not normally provide good rebake flexibility.

While certain features of this invention have been described in detail with resepct to various embodiments thereof, it will, of course, be apparent that other modifications can be made within the spirit and scope of this invention, and it is not intended to limit the invention to the exact details shown above except insofar as they are defined in the following claims.

The invention claimed is:

1. A resin composition suitable for coating metals to give protective coatings of improved flexibility comprising:

(a) 50–95 percent by weight, based on total polyester content, of a linear polyester having high chain stiffness, an aromaticity as defined herein below of at least 25 percent, a molecular weight of 1,500–8,000, and the combination of acid and hydroxyl numbers totalling 20–52 mg. KOH per gram;

(b) 5–50 percent by weight, based on total polyester content, of a linear polyester having high chain flexibility, an aromaticity of less than 20 percent, a molecular weight of 1,500–8,000, and a combined acid and hydroxy number of 20–52 mg. KOH per gram;

(c) 5–30 parts by weight, based on 100 parts by weight of polyester, of an aminoplast having the formula

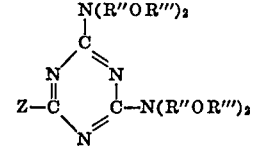

wherein:

Z is a group selected from the class consisting of

—N(R"OR''')₂, —Cl, —Br, —R'''',

—N(R'''')₂, —NR'''(R"OR'''),

—NH—C₃N₃[N(R"OR''')₂]₂ and —NHCH₂NH—C₃U₃[N(R"OR''')₂]₂;

R" is a divalent saturated aliphatic hydrocarbon radical of 1–6 carbon atoms having both valencies on the same terminal carbon atoms;

R''' is a group selected from the class consisting of alkyl groups of 1–6 carbon atoms and groups having the formula

—(CHRCHRO)ₓ—R'[O(CHRCHRO)ₓ'—Hₙ];

R represents hydrogen, methyl or ethyl;

R' represents a polyvalent aliphatic radical of 2–5 carbon atoms with a valency of n+1;

n represents an integer having a value of 1 to 3, and having a value of only 1 when R' has only two carbon atoms;

x represents an integer having a value of 1 or more;

x' represents 0 or an integer having a value of 1 or more, and the total value of x and x' being such that the R''' is equivalent to a molecular weight of not over 2,000; and R'''' represents hydrogen or a hydrocarbon group of 1–12 carbon atoms with aliphatic portions thereof being saturated; and (d) 0.05–1 part, per 100 parts of polyester, of an acid catalyst having an ionization constant of at least $10^{-2}$;

said aromaticity being calculated as the weight percent of a polyester component representing the cyclic structures therein, said polyesters being substantially free of oil-modified polyester and said molecular weights being number average molecular weights determined by end group analysis.

2. The resin composition of claim 1 in which the aliphatic portions thereof are saturated and said polyesters have molecular weights of 2,000–5,000.

3. The resin composition of claim 2 in which said polyester of high flexibility has an aromaticity of 0–5 percent.

4. The resin composition of claim 3 in which said polyester of high stiffness represents 60–80 percent by weight and said polyester of high flexibility represents 20–40 percent by weight of said combined weight of polyesters.

5. The resin composition of claim 3 in which said aminoplast comprises 10–15 parts by weight per 100 parts of said polyesters.

6. The resin composition of claim 5 in which said acid catalyst is an aromatic sulfonic acid.

7. The resin composition of claim 5 in which said aminoplast is a melamine derivative having at least four alkyloxyalkyl groups attached to the amino groups of the melamine structure and each of said alkyl groups and each of said alkyloxy groups having 1–6 carbon atoms therein.

8. The resin composition of claim 5 in which said aminoplast is hexakis(methoxymethyl)melamine.

9. The resin composition of claim 5 in which said aminoplast is the reaction product of hexakis(methoxymethyl)melamine and a polyether polyol derived by replacing one or more hydroxy groups of an aliphatic polyol selected from the class consisting of ethylene glycol, propylene glycol, glycerine, 1,1,1-trimethylol propane and pentaerythritol with an alkyleneoxy radical of the formula HO(CHRCHRO)$_x$— wherein R is hydrogen, methyl or ethyl, and x is an integer having a value of at least 1 and does not exceed a value which gives the resultant polyol a molecular weight above 2,000.

10. The resin composition of claim 9 in which said flexible polyester is poly(methyldimethylene adipate).

11. The resin composition of claim 10 in which said stiff polyester is poly(methyldimethylene isophthalate).

12. The resin composition of claim 1 in which said flexible polyester is poly(methyldimethylene adipate).

13. The resin composition of claim 1 in which said stiff polyester is poly(methyldimethylene isophthalate).

14. The resin composition of claim 1 in which said flexible polyester is poly(methyldimethylene glutarate).

15. The resin composition of claim 1 in which said flexible polyester is poly(methyltrimethylene adipate).

16. The resin composition of claim 1 in which said flexible polyester is poly(methyldimethylene glutarate).

17. The resin composition of claim 1 in which said stiff polyester is poly(methyltrimethylene isophthalate).

18. A cured composition of claim 1 in which said catalyst is an aromatic sulfonic acid and said curing is effected in an oven having an ambient temperature of at least 300° F., the minimum curing time being inversely proportional to increasing temperatures and the decrease in minimum curing time corresponding approximately to at least 80 seconds at 300° F., at least 60 seconds at 400° F., at least 50 seconds at 500° F. and at least 10 seconds at 940° F.

19. A cured composition of claim 1 in which said catalyst is an aromatic sulfonic acid and said composition is cured by application to the surface of a metal preheated to 380–470° F.

References Cited

UNITED STATES PATENTS

| | | |
|---|---|---|
| 2,915,487 | 12/1959 | Shelley _____ 260—850 |
| 3,442,842 | 5/1969 | Von Bunin _____ 260—850 |
| 2,683,100 | 7/1954 | Edgar et al. _____ 260—850 |
| 2,915,419 | 12/1959 | Wolfrom _____ 260—850 |
| 3,678,128 | 7/1972 | Riemhofer et al. ____ 260—850 |
| 3,704,255 | 11/1972 | Braun _____ 260—850 |
| 3,382,295 | | Taylor _____ 260—860 |

JOHN C. BLEUTGE, Primary Examiner

U.S. Cl. X.R.

117—161 LN, 161 K; 260—31.2 N, 32.8 N, 33.2 R, 33.6 R, 67.6 R, 67.6 C, 860

UNITED STATES PATENT OFFICE
CERTIFICATE OF CORRECTION

Patent No. 3,804,920                        Dated April 16, 1974

Inventor(s) Arthur L. Cunningham et al

It is certified that error appears in the above-identified patent and that said Letters Patent are hereby corrected as shown below:

Col. 3, line 44, correct "cid" to read---acid---;

Col. 4, line 10, correct "precent" to read---percent---;

Col. 20, line 65, in the middle of the formula, correct "U" to read ---N---;

line 68, correct "atoms" to read ---atom---;

line 72, at the end of formula, correct "-H$_n$]" to read ----H]$_n$---.

Signed and sealed this 24th day of September 1974.

(SEAL)
Attest:

McCOY M. GIBSON JR.                C. MARSHALL DANN
Attesting Officer                  Commissioner of Patents